United States Patent [19]

Tadokoro et al.

[11] 4,298,940
[45] Nov. 3, 1981

[54] SLIPPING DETECTOR SYSTEM FOR VEHICLES

[75] Inventors: Tomio Tadokoro, Katsuta; Tatsuro Horie, Mito, both of Japan

[73] Assignee: Hitachi, Ltd., Tokyo, Japan

[21] Appl. No.: 46,330

[22] Filed: Jun. 7, 1979

[30] Foreign Application Priority Data

Jun. 10, 1978 [JP] Japan .................................. 53-69386

[51] Int. Cl.³ .......................... G06F 15/20; H02P 5/50
[52] U.S. Cl. ...................................... 364/426; 318/52
[58] Field of Search ................ 364/426, 483; 318/52, 318/69, 71; 105/61

[56] References Cited

U.S. PATENT DOCUMENTS

| | | | |
|---|---|---|---|
| 3,737,745 | 6/1973 | Chevaugeon et al. | 318/52 |
| 3,898,937 | 8/1975 | Johnson | 318/52 X |
| 3,982,164 | 9/1976 | De Buhr et al. | 318/52 |
| 4,066,300 | 1/1978 | Devlin | 364/426 X |
| 4,095,147 | 6/1978 | Mountz | 318/52 |
| 4,136,303 | 1/1979 | Almquist et al. | 318/52 |
| 4,184,203 | 1/1980 | Skarvada | 364/426 |

*Primary Examiner*—Jerry Smith
*Attorney, Agent, or Firm*—Craig and Antonelli

[57] ABSTRACT

A railway vehicle has a plurality of motors for driving a plurality of wheels respectively, which motors are controlled to produce the same current to attain the same torque for each motor. These current values are detected respectively and received alternately in time division manner. A current value received is stored until the next current value for the same motor is received. The current value newly received is compared with the immediately previously stored current value for the same motor and the error therebetween is detected. When the current variation for the motor is larger than a predetermined value, the slipping of the wheel driven by that motor is detected. Also a received current value is compared with the current values for the other motors, and if the error is larger than a predetermined value, the slipping of the wheel driven by the motor associated with the received current value is detected.

19 Claims, 15 Drawing Figures

SLIPPING DETECTOR SYSTEM FOR VEHICLES

BACKGROUND OF THE INVENTION

1. Field of the Invention

The present invention relates to an improvement in the system for detecting the slipping of railway vehicles.

2. Description of the Prior Art

A railway vehicle has a plurality of wheels driven by motors, i.e., driving wheels, and it is common practice to control each motor to attain the same current value. When a driving wheel slips, the current of the motor driving that driving wheel is reduced. If this situation is left as it is, the control system works in such a manner as to increase the current of the motor, resulting in an aggravated slipping.

In a conventional control system, the reduction of the motor current is detected and if the degree of reduction exceeds a predetermined value, the slipping of the driving wheel driven by that particular motor is detected. The general current command is then reduced to attain "readhesion", i.e., renewed frictional engagement between the rail and wheel.

In this conventional system for detecting the degree of reduction of the motor current, the current is monitored for each motor and therefore the system is both bulky and uneconomical. It is also impossible for this system to detect a slipping with high accuracy taking into consideration the difference in diameter among the driving wheels, the difference in characteristics among the motors and the difference in slip detection level with speed.

SUMMARY OF THE INVENTION

It is an object of the present invention to provide a slipping detection system for vehicles capable of detecting slipping with a simple and economical device.

Another object of the present invention is to provide a slipping detection system for a vehicle capable of detecting a slipping with high accuracy.

According to the present invention, there is provided a slipping detection system for railway vehicles comprising means for detecting the electric value changing with the rotational speed of a driving wheel, which means is provided for each of the driving wheels, means for receiving the outputs of the electric value detector means in time division manner, means for storing a received electric value until receipt of another electric value, means for comparing the newly received electric value with the previously received electric value, and means for detecting a slipping of a driving wheel when the difference between the newly received electric value and the previously received electric value exceeds a predetermined value.

DESCRIPTION OF THE PREFERRED EMBODIMENTS

Figure 1:
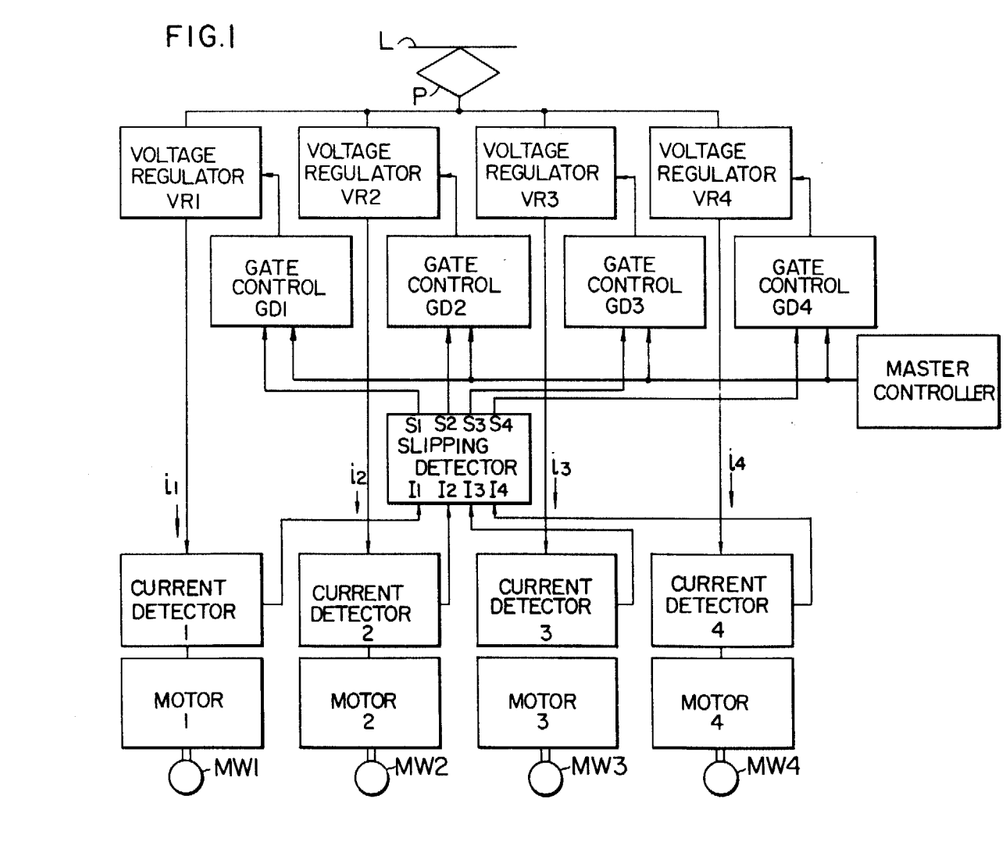
FIG. 1 is a block diagram schematically showing an electric car control system havinhg a slipping detection system for a vehicle according to an embodiment of the present invention.

A block diagram of the electric car control system is shown in FIG. 1. Power is supplied to voltage regulators VR1 to VR4 from a line L via a pantograph P. In the case of the AC electric car, the voltage regulators VR1 to VR4 comprise a transformer and a controlled rectifier circuit, while in the case of the DC electric car, they typically comprise a resistance control circuit or a chopper circuit. The explanation below will be made with reference to the AC electric car in which the voltage regulators VR1 to VR4 comprise a transformer and a controlled rectifier circuit. The output voltages of the voltage regulators VR1 to VR4 are applied to the main motors MM1 to MM4 which drive the driving wheels MW1 to MW4 respectively. The master controller MC is used by the operator to issue a notch command. Specifically, the notch command takes the form of a motor current command applied to the gate control means GD1 to GD4. On the other hand, the current flowing through the motors MM1 to MM4 is detected by the current detectors CD1 to CD4 and fed back to the gate control means GD1 to GD4 through the slipping detector section SD. Thus the gate control means GD1 to GD4 operate to compare the current command signal with the current feedback signal and phase-control the thyristors in the voltage regulators VR1 to VR4 in accordance with the error therebetween. As a result, the current of the motors MM1 to MM4 is controlled to coincide with the current command of the master controller MC respectively.

Assume that the driving wheel MW1 has slipped. The rotational speed of the main motor MM1 sharply increases and the current il thereof decreases. Under this condition, the above-mentioned control system operates so that the output voltage of the voltage regulator VR1 increases in an attempt to make the reduced current il coincide with the current command. The result is that the rotational speed of the main motor MM1, i.e., the rotational speed of the slipping driving wheel MW1 further increases producing an aggravated slipping. This inconvenience is obviated by the slipping detector section SD which operates to accomplish the "readhesion" of the slipping driving wheel.

Figure 2:
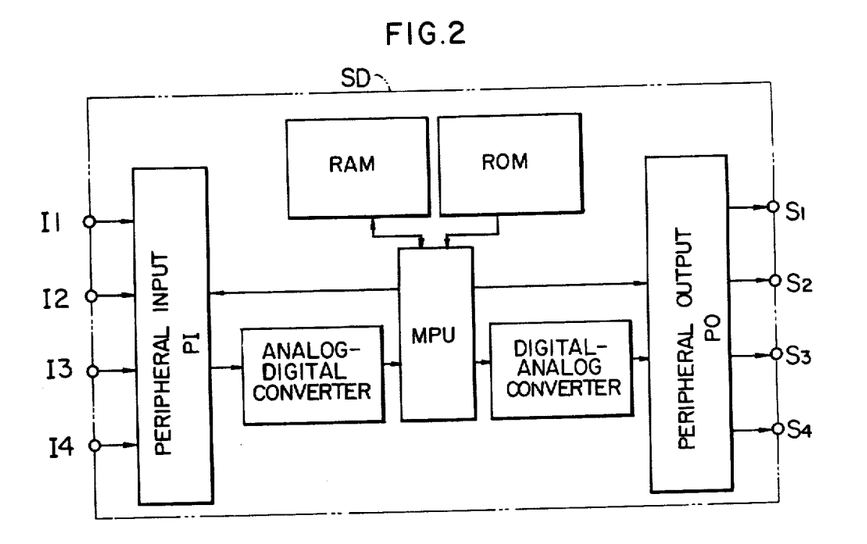
FIG. 2 is a diagram showing the configuration of an embodiment of the slipping detection system SD shown in FIG. 1.

An example of the configuration of the slipping detector section SD is shown in FIG. 2. Input terminals I1 to I4 are kept impressed with motor current signals i1 to i4 detected by the current detectors CD1 to CD4. The peripheral input PI is for applying the input signals i1 to i4 alternately to the analog-digital converter A/D by time division in response to a command from the microprocessing unit MPU. In other words, the currents i1, i2, i3, i4, i1, i2 and so on are applied in that order at predetermined regular intervals of time. The analog-digital converter A/D converts the analog signals thus received into a digital signal at appropriate timing. Such digital signal is applied to the microprocessor unit MPU. The read-only memory ROM contains a program to be executed by the microprocessor unit MPU. The microprocessor unit MPU keeps the received digital signals i1 to i4 stored in the random access memory RAM until corresponding signals are received respectively. Thus the random access memory RAM always contains the latest signals i1 to i4. Generally, these signals i1 to i4 are applied to the peripheral output P0 through the digital-analog converter D/A by time division and distributed among the output terminals S1 to S4 in accordance with the command from the microprocessor unit MPU. In the absence of a slipping, therefore, the motor current signals i1 to i4 applied to the input terminals I1 to I4 respectively are equivalent to the output signals applied to the output terminals S1 to S4 respectively. As a consequence, the currents of the motors MM1 to MM4 are controlled to coincide with the command of the master controller MC by the current control system described with reference to FIG. 1.

In accordance with the program of the read-only memory ROM, the microprocessor unit MPU compares each of the newly received current signals i1 to i4 with all of the current signals stored in RAM, thus identifying the case where the error therebetween exceeds a predetermined value. In other words, the microprocessor unit MPU operates to make sure whether or not the conditions mentioned below are established when the current signal i1 (n) of the motor MM1 is received.

$$i1(n-1) - i1(n) - \Delta i11 > 0 \quad (1)$$

$$i2(n-1) - i1(n) - \Delta i12 > 0 \quad (2)$$

$$i3(n-1) - i1(n) - \Delta i13 > 0 \quad (3)$$

$$i4(n-1) - i1(n) - \Delta i14 > 0 \quad (4)$$

where $\Delta i11$ to $\Delta i14$ are predetermined values stored in RAM or ROM in advance. All of these predetermined values are the same in principle but may alternatively have the relations described below in consideration of the difference in characteristics among the main motors MM1 to MM4 and the difference in wheel diameter among the driving wheels MW1 to MW4.

$$\Delta i11 = \Delta i12 = \Delta i13 = \Delta i14 \quad (5)$$

$$\Delta i11 \neq \Delta i12 = \Delta i13 = \Delta i14 \quad (6)$$

$$\Delta i11 \neq \Delta i12 \neq \Delta i13 \neq \Delta i14 \quad (7)$$

In the case where any of the above relations (1) to (4) is satisfied, the driving wheel MW1 is considered to be slipping and therefore the output at the output terminal S1 is increased by the microprocessor unit MPU. As a result, in FIG. 1, the current feedback signal applied to the gate control means GD1 is forcibly increased and therefore the output voltage of the voltage regulator VR1 is reduced, so that the speed of the motor MM1, i.e., the speed of the driving wheel MW1 is reduced, thus permitting the wheel readhesion.

Figure 3:
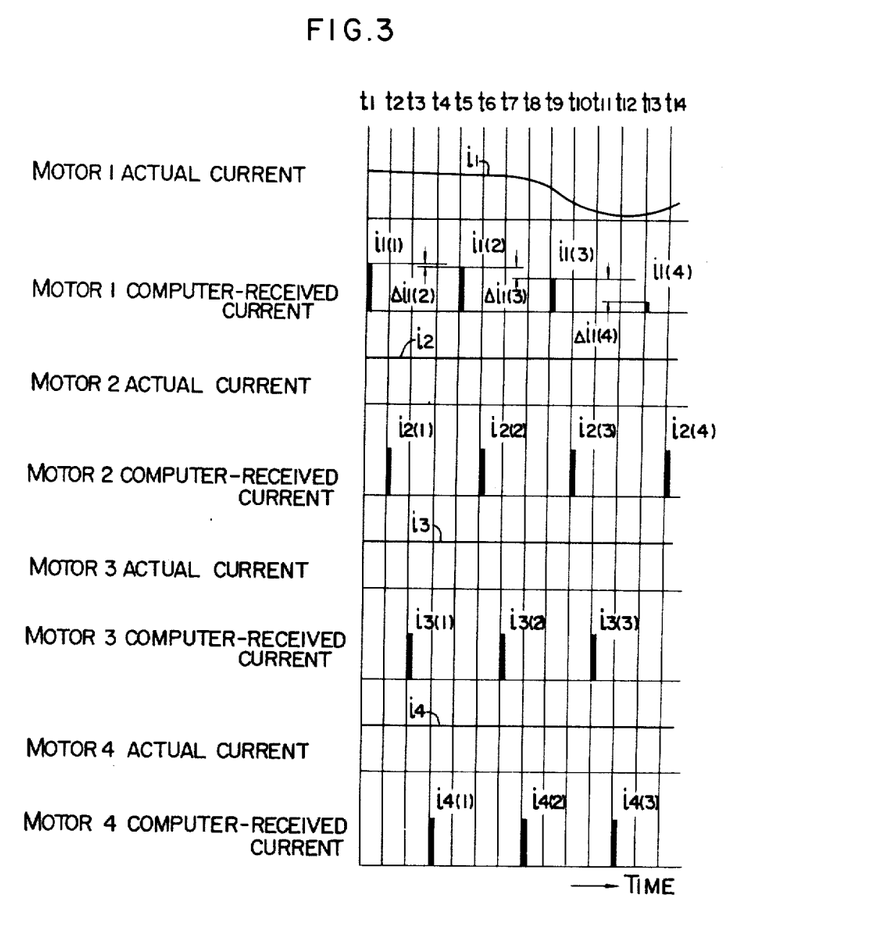
FIG. 3 is a time chart for explaining the operation of the present invention.

This process is illustrated in the time chart of FIG. 3. The actual currents i2 to i4 in the motors MM2 to MM4 remain unchanged and so do the received currents i2(1) to i2(4), i3(1) to i3(3) and i4(1) to i4(3). Since the slip of the driving wheel MW1 has occurred, however, the actual current i1 of the motor MM1 is reduced. So do the received currents i1(1) to i1(4) thereof. As a result, the difference with the stored current i1(1) which is $\Delta i1(2)$ at the time point $t_5$ when the current i1(2) of the motor MM1 is received is increased to $\Delta i1(3)$ at time point $t_9$, and to $\Delta i1(4)$ at time point $t_{13}$. If the error $\Delta i1(4)$ at time point $t_{13}$ is larger than the predetermined value $\Delta i11$ of inequality (1), the output S1 is increased as mentioned above and the system operates to accomplish readhesion, after which the current i1 restores its original value. The conditions of inequalities (2) to (4) are not shown in the drawing under consideration. Assume that $i1(1) = i2 = i3 = i4$. At time point $t_9$, for instance, the error between the stored current i2(2) and the received current i1(3) is $\Delta i1(2) + \Delta i1(3)$. If this error exceeds the predetermined value $\Delta i12$ of inequality (2), then the slipping of the driving wheel MW1 is detected at time point $t_9$. In this way, comparison with other stored values of the motor current permits earlier detection of a slipping.

The foregoing description concerns the slipping of the driving wheel MW1. It will also be understood easily that in the case of the slipping of one of the other driving wheels MW2 to MW4 or simultaneous slipping of two or more driving wheels, the slipping driving wheel or wheels, as the case may be, are rapidly detected.

The processes of the slipping detection will be explained with reference to FIGS. 4 to 7.

Figure 4:
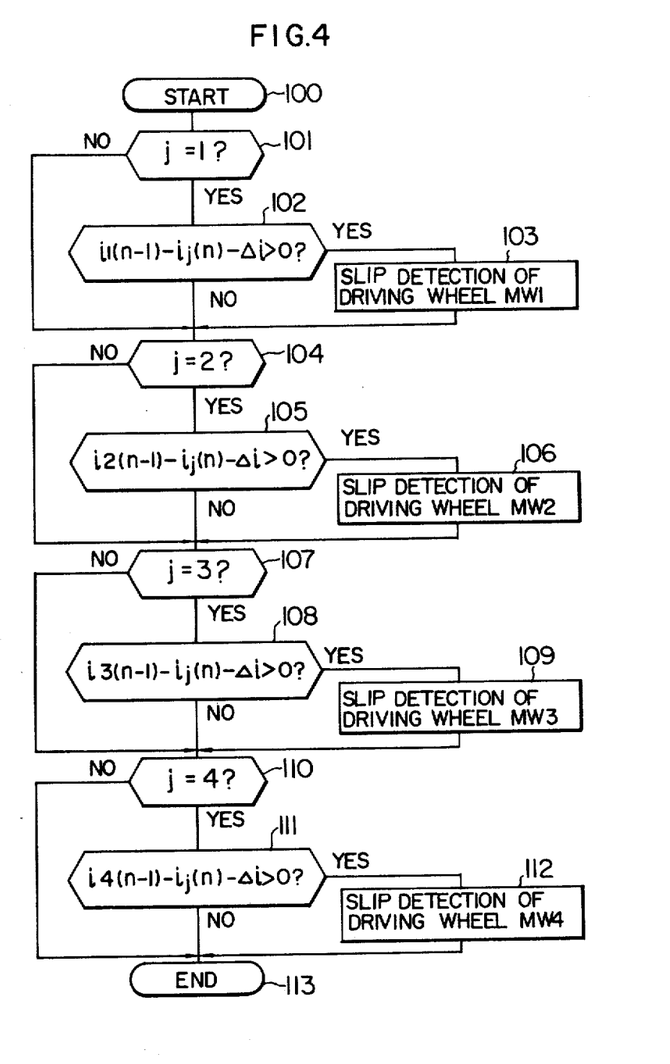
FIGS. 4, 5, 6A, 6B, 7A, and 7B are flowcharts showing the basic steps of accomplishing different embodiments of the present invention with a microcomputer.

The flowchart of FIG. 4 shows the basic steps of the program for detecting the slipping of a driving wheel when the difference between the value of the received current of the associated motor and the previous value, i.e., the stored value of the current of the same motor exceeds the predetermined value $\Delta i$.

At step 100, the program begins. At step 101, it is determined whether j = 1 or not for the current signal ij (j = 1 to 4). If j = 1, transfer is made to the judgement step 102 to conduct judgement of inequality (1) mentioned above. In this example, the predetermined value is always $\Delta i$ and the relation $\Delta i11 = \Delta i$ is maintained in inequality (1). If the answer is "Yes" in the inequality (1), transfer is made to the processing step 103 thereby to detect the slipping of the driving wheel MW1, so that the output of the output terminal S1 in FIGS. 1 and 2 is increased. Then transfer is made to step 104. Transfer is also made to step 104 when j is not 1 at judgement step 101 or the answer is "No" to the question of inequality (1) in the judgement step 102. In similar fashion, the slipping or not of the driving wheels MW2 to MW4 is judged in accordance with the received current signal ij(n). The program thus ends at step 113.

Figure 5:
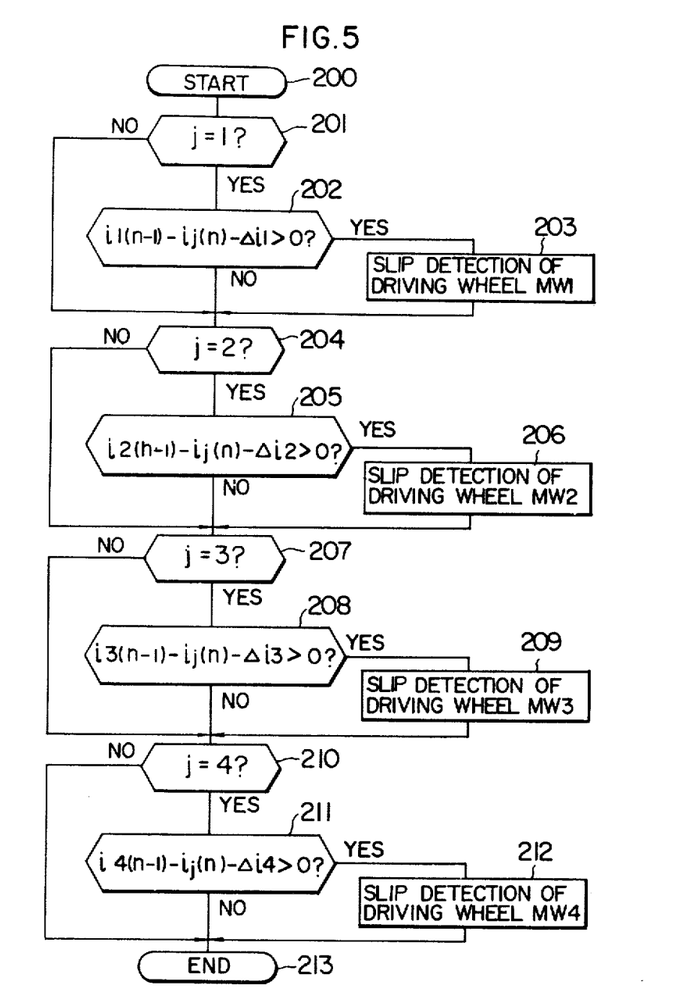

The flowchart of FIG. 5 is fundamentally identical to that of FIG. 4 but different from FIG. 4 in that in the flowchart of FIG. 5 the predetermined value (reference value) of the current difference for judging the slipping is determined variously at $\Delta i1$ to $\Delta i4$ for the driving wheels MW1 to MW4. In this way, if the motors have different characteristics or otherwise, a proper slipping detection level is set for each driving wheel.

Figure 6A:
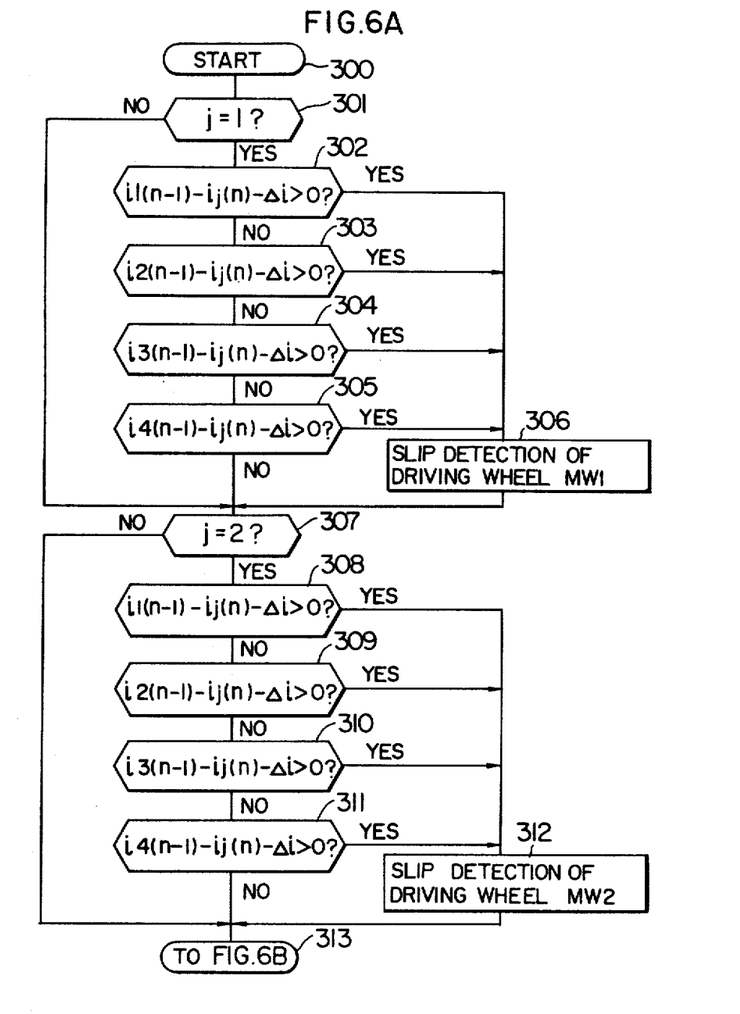
Figure 6B:
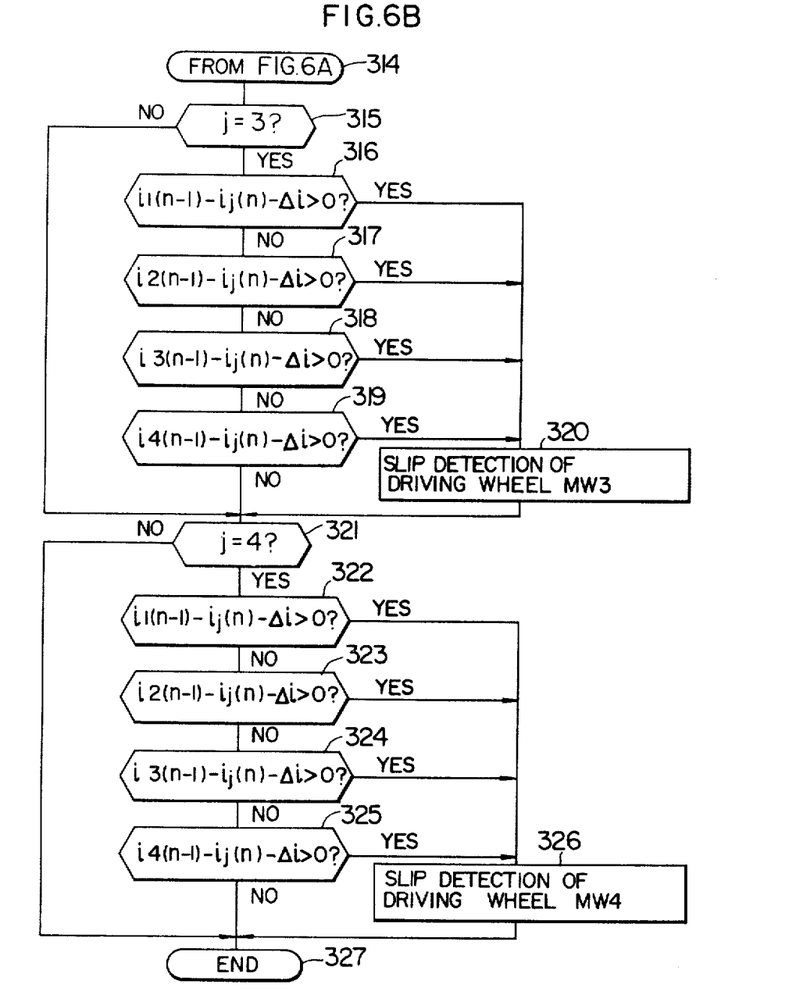

The flowcharts of FIGS. 6A and 6B show the fundamental steps of the program for detecting the slipping of a driving wheel if, as a result of comparison between the received current of the associated motor and all the stored motor current values, the difference therebetween exceeds a predetermined value $\Delta i$. The program starts at step 300 and it is determined whether or not j = 1 for the received current signal ij(i = 1 to 4) at the judgement step 301. If j = 1, the current value i1(n−1)

stored on the immediately previous occasion (n−1) for the motor MM1 is compared with the presently received current value ij(n)=i1(n) for the same motor MM1 and decides whether or not the difference therebetween is larger than the predetermined value Δi, i.e., whether or not i1(n−1)−ij(n)−Δi>0(j=1) at the judgement step 302. If the answer is "Yes", the driving wheel MW1 is judged to be slipping, and therefore transfer is made to the step 306.

If the answer to the judgement step 302 is "No", on the other hand, transfer is made to the judgement step 303, where the current value i2(n−1) stored on the previous occasion (n−1) for the motor MM2 is compared with the presently received current value ij(n)=i1(n) for the motor MM1, and it is judged whether or not the error therebetween exceeds the predetermined value Δi, i.e., whether or not i2(n−1)−ij(n)−Δi>0(j=1). If the answer is "Yes", the driving wheel MW1 is judged to be slipping and transfer is made to the processing step 306.

In similar fashion, comparison is also made with the stored current values i3(n−1) and i4(n−1) for other motors MM3 and MM4 in the judgement steps 304 and 305, thus judging whether the driving wheel MW1 is slipping or not.

Not only in the case where j is not 1 in the judgement step 301 but also in the case where the answer is "No" in the step 305 or after the processing step 306, transfer is made to the judgement step 307. The subsequent judgement steps 308 to 311 and the processing step 312 are for judging whether the driving wheel MW2 is slipping or not and executing the program in the fashion similar to that mentioned above. Further, in FIG. 6B, it is determined whether or not the driving wheels MW3 and MW4 are slipping, so that the program ends at the step 327.

Figure 7A:
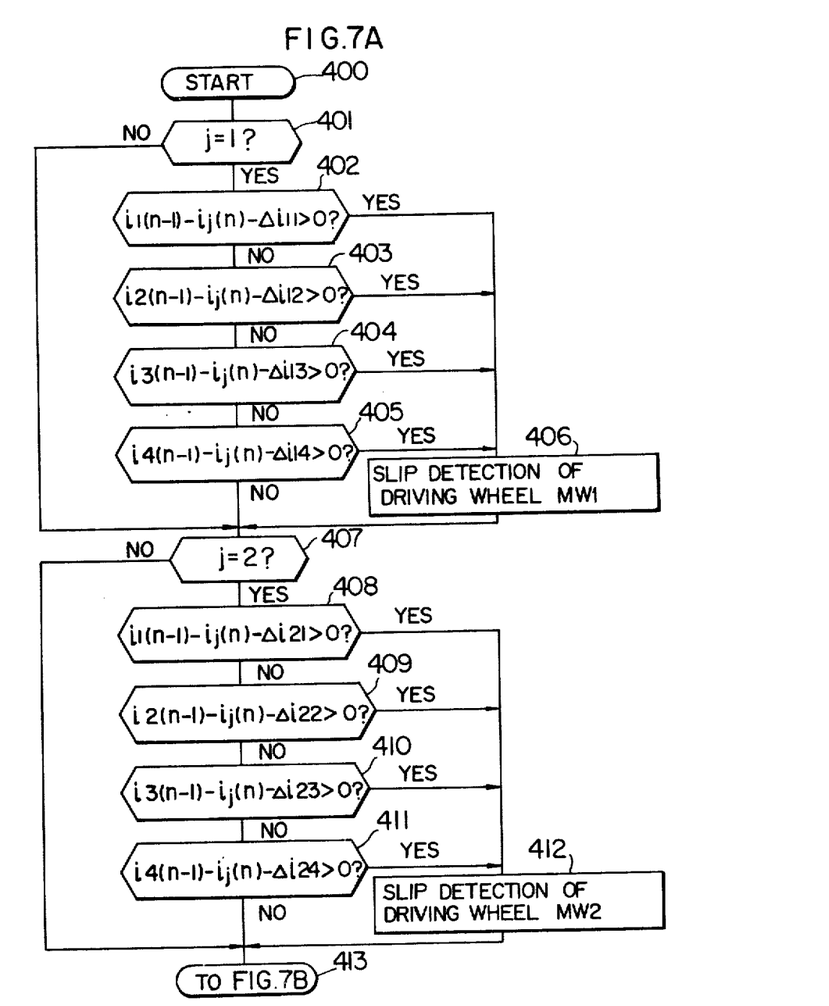
Figure 7B:
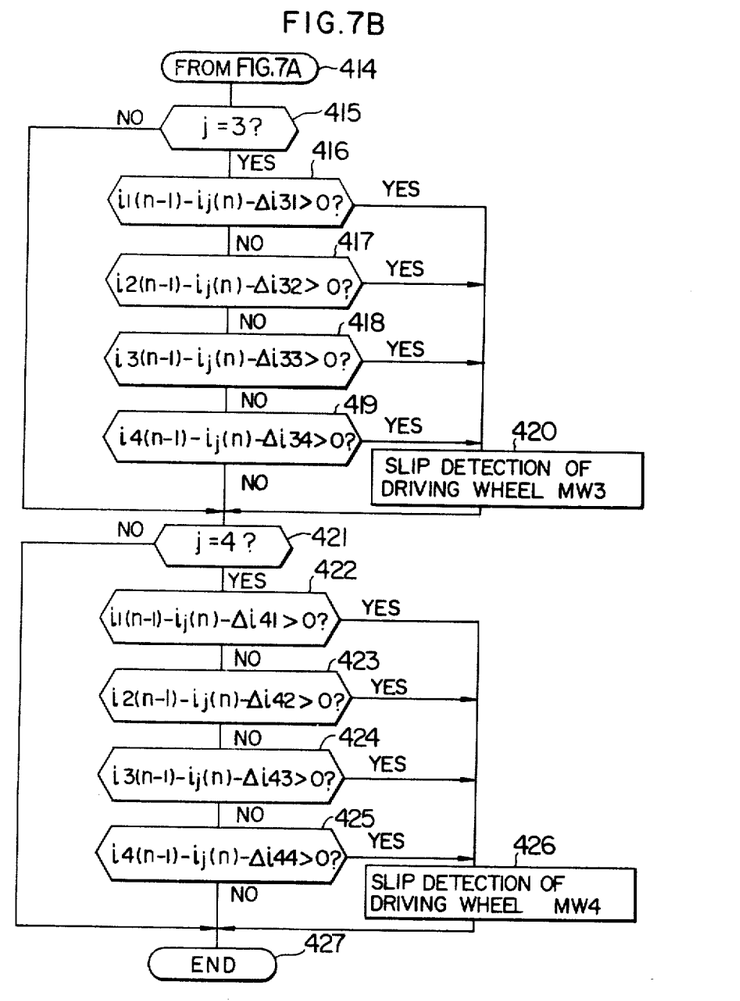

The flowchart of FIGS. 7A and 7B is fundamentally the same as that of FIGS. 6A and 6B but different in that in the flowchart of FIGS. 7A and 7B the reference value (predetermined value) of the slip judgement for each judgement step is set independently of each other. In other words, the predetermined values Δi11 to Δi14 are provided for slip detection for the driving wheel MW1, the predetermined values Δi21 to Δi24 for the driving wheel MW2, the predetermined values Δi31 to Δi34 for the driving wheel MW3 and the predetermined values Δi41 to Δi44 for the driving wheel MW4.

By providing an independent reference value for judgement for each driving wheel, it is possible to detect slipping with high accuracy taking into account the difference in wheel diameter, the difference in motor characteristics, etc.

Figure 8:
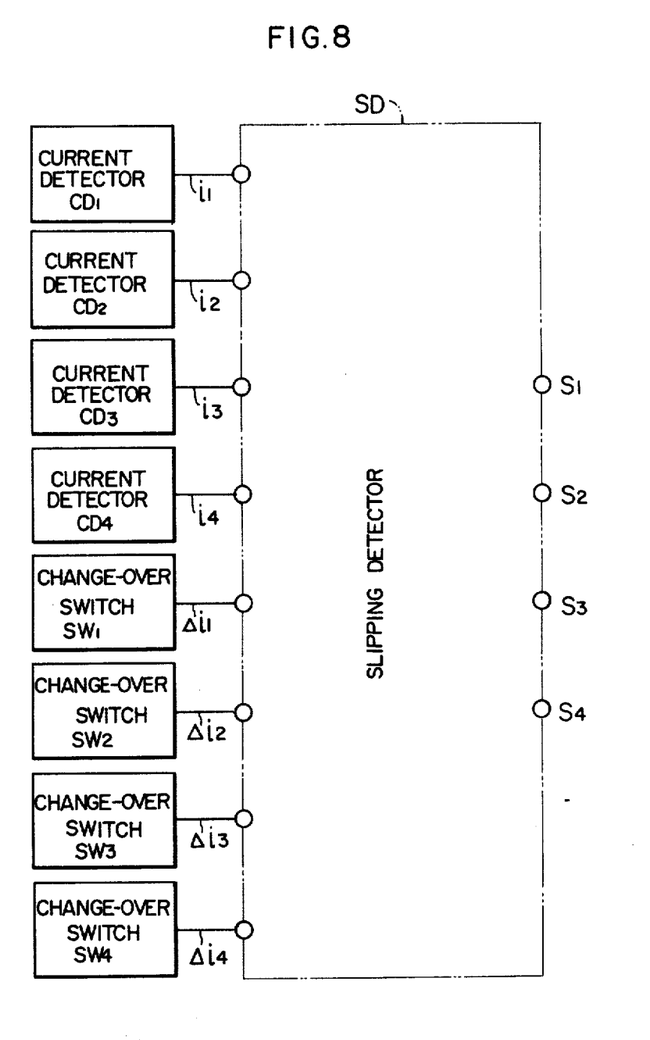
FIGS. 8 and 9 are diagrams showing configurations of embodiments in which various corrections are made of the slipping detection section.

The block diagram of FIG. 8 shows the case in which the sensitivity of slip detection is set as desired by the signals of external switches. While motor signals i1 to i4 are applied from the current detectors CD1 to CD4 to the slipping detectors SD by time division on the one hand, slip detection sensitivity signals Δi1 to Δi4 are received from the slip detection sensitivity change-over switches SW1 to SW4 by time division on the other hand. In this way, without changing the pattern of the slip detection point in the slipping detector SD using a microcomputer, the slip detection sensitivity is freely switched by means of the external switches SW1 to SW4.

Figure 9:
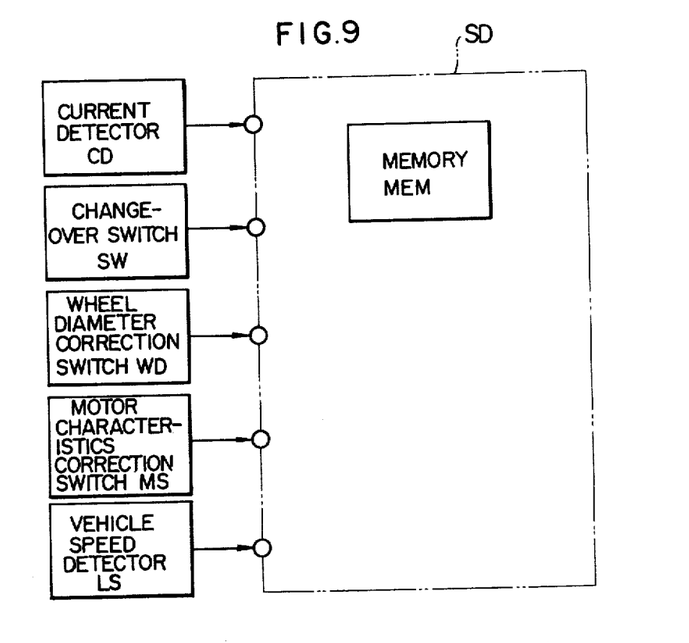

The block diagram of FIG. 9 shows a slip detector comprising means of correcting the slip detection sensitivity as well as the slip detection sensitivity change-over switches SW. In addition to the current detector CD, this embodiment includes sensitivity change-over switches SW for changing the slip detection sensitivity, a wheel diameter correction switch WD for correcting the sensitivity in accordance with the size of the diameter of the driving wheels, a motor characteristics correction switch MS for correcting the r.p.m. characteristics with respect to the current of the main motor, and a vehicle speed detector LS for correcting the detection point in accordance with the vehicle speed. These correction signals are applied by time division to the slipping detector SD, where they are compared with the information stored in the memory MEM, thus detecting the slipping by determining whether or not there is a slipping after correction.

Figure 10:
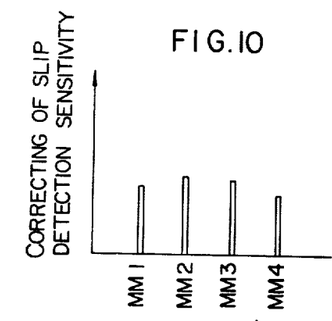
FIGS. 10 and 11 are diagrams for explaining the slip detection sensitivity correction and the wheel diameter correction respectively.

The diagram of FIG. 10 shows the case in which the slip detection sensitivity is changed with each motor and is set at a value convenient for detection for each motor. For the purpose of setting such a value, the memory MEM of the microcomputer in the slip detector SD is used. If it is desired to further correct the information stored in the memory MEM, the setting of the sensitivity change-over switch SW for external signals is changed.

Figure 11:
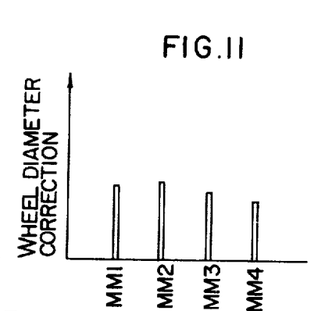

With reference to FIG. 11 showing the case in which the wheel diameter is corrected for each motor to correct the slip detection point, each motor is set in accordance with the degree of wear of the wheel by use of the memory MEM of the microcomputer. If it is desired to further correct the data stored in the memory MEM, the setting of the wheel diameter correction switch WD for external signals is changed.

Figure 12:
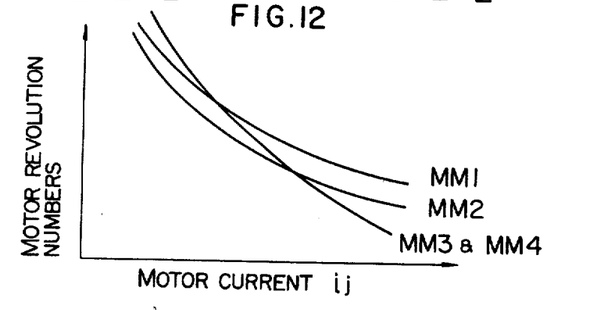
FIGS. 12 and 13 are diagrams for explaining the motor revolution number and the slip detection sensitivity respectively.

The diagram of FIG. 12 shows the motor characteristics correction curves associated with the case in which the motor r.p.m. for motor current is stored in the memory MEM of the microcomputer for each motor. The motor r.p.m. for motor current is stored in the memory MEM for each motor, thus correcting the stored data on the slip detection sensitivity in accordance with the motor characteristics.

Figure 13:
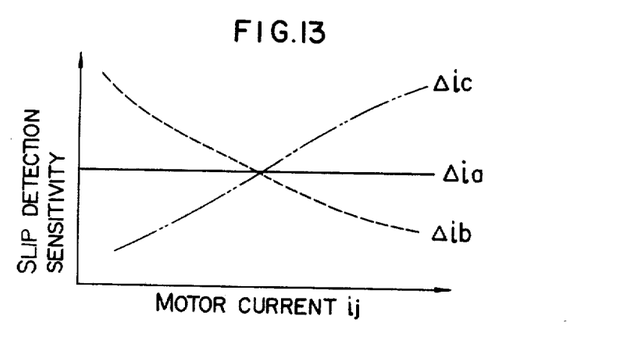

The diagram of FIG. 13 shows the case in which the slip detection sensitivity is corrected in accordance with the motor current. In the characteristics Δia, the slip detection sensitivity remains unchanged with the motor current, while in the characteristics Δib and Δic, the slip detection sensitivity changes with motor current. In the case of characteristics Δib, the slip detection sensitivity is higher, the lower the vehicle load when the motor current is lower. In the characteristics Δic, on the other hand, the slip detection sensitivity is higher, the larger the load when the vehicle starts with a large motor current. By storing these slip detection sensitivity characteristics in the memory MEM of the microcomputer, the slip detection sensitivity is capable of being corrected in accordance with the motor current.

In each of the above-mentioned embodiments, a digital control device is used as a nucleus for the control function. As an alternative to the digital control device, an analog control device may be used with equal effect. Since the analog control device has a limitation in memory capacity, however, the digital control device is actually more advantageous. More specifically, a program-contained computer, especially, a microprogram type microcomputer is most suitable to the present invention. Such computers are compact and sufficiently large in capacity to effectively function in the other fields of vehicle control in addition to the slip detection control.

In the above-described embodiments, the current of the vehicle-driving main motor is detected as an input signal for detecting slipping. In place of such a current, a voltage may be used with equal effect. Further, the output of the tachogenerator mounted on the driving shaft of the vehicle may be used as an input signal for the slip detector to attain quite the same effect of slip detection. In this case the following formulas (8) to (11) are utilized instead of the formulas (1) to (4).

$$i1(n-1) - i1(n) + \Delta i11 < 0 \tag{8}$$

$$i2(n-1) - i1(n) + \Delta i12 < 0 \tag{9}$$

$$i3(n-1) - i1(n) + \Delta i13 < 0 \tag{10}$$

$$i4(n-1) - i1(n) + \Delta i14 < 0 \tag{11}$$

This latter method is especially suitable to a vehicle powered by an internal combustion engine without any main motor.

It will be understood from the foregoing description that according to the present invention a compact and economical slip detector light in weight is provided.

We claim:

1. A slipping detection system for vehicles having wheels driven by motors, comprising
    means for detecting at least one electric value which changes in relation to the rotational speed of at least one of the wheels;
    means for detecting the change in said electric value; and
    means for detecting the slipping of said one wheel when the change in said electric value associated with said wheel is larger than a predetermined value, including means for receiving the output of said electric value detector means in a time division manner, memory means for storing a currently-received electric value until a subsequent electric value is received, means for comparing said subsequently-received electric value with said current electric value received previously as stored in said memory means, and means for detecting a slipping of said wheel when the difference between said subsequent electric value and said previously-received stored electric value exceeds a predetermined value.

2. A slipping detection system according to claim 1, wherein said electric value is the current value of the motor for driving said wheel.

3. A slipping detection system according to claim 1, wherein said electric value is the voltage value of the motor for driving said wheel.

4. A slipping detection system according to claim 1, wherein said electric value is the output voltage value of a tachogenerator coupled to said wheel.

5. A slipping detection system according to claim 1, further comprising means for regulating said predetermined value.

6. A slipping detection system according to claim 5, wherein said regulator means includes means for storing a plurality of different values and means for selecting one of said plurality of said values as a predetermined value.

7. A slipping detection system according to claim 5, wherein said regulator means includes means for storing a plurality of functions providing different output characteristics for respective electric values applied, and means for selecting one of said plurality of said functions in accordance with the wheel associated with said newly received electric value, said function being selected as said predetermined value.

8. A slipping detection system according to claim 1, wherein said memory means includes a random access memory, and said comparator means and said slipping-detecting means includes a microprocessor unit and a read only memory.

9. A slipping detection system for a vehicle having wheels driven by motors, comprising
    a plurality of means for detecting at least one electric value changing in relation to the rotational speed of a plurality of said wheels, a respective one of said means being provided for each of said wheels;
    means for receiving a plurality of outputs of said electric value detector means alternately in a time division manner;
    memory means for storing the electric value for said wheels until a new electric value is received for the same wheel;
    means for comparing the newly-received electric value with the already-received corresponding electric value and non-corresponding electric value stored in said memory means; and
    means for judging a slipping of the associated wheel when at least one of the differences between said newly-received electric value and said already-received corresponding electric value and said already-received non-corresponding electric value exceeds a predetermined value.

10. A slipping detection system according to claim 9, wherein said electric value is the current value of the motor for driving each of said wheels.

11. A slipping detection system according to claim 9, wherein said electric value is the voltage value of the motor for driving each of said wheels.

12. A slipping detection system according to claim 9, wherein said electric value is the output voltage value of a tachogenerator coupled to each of said wheels.

13. A slipping detection system according to claim 9, further comprising means for regulating said predetermined value.

14. A slipping detection system according to claim 13, wherein said regulator means includes means for storing a plurality of different values and means for selecting one of said values as a predetermined value.

15. A slipping detection system according to claim 13, wherein said regulator means includes means for storing a plurality of values and means for selecting one of said values as a predetermined value for each of said wheels.

16. A slipping detection system according to claim 13, wherein said regulator means includes means for storing a plurality of different values, means for selecting one of said values as a predetermined value of the error between corresponding electric values, and means for selecting one of said values as a predetermined value of the error between a corresponding electric value and a non-corresponding electric value.

17. A slipping detection system according to claim 13, wherein said regulator means includes means for storing a plurality of functions having output characteristics different with the received electric value, and means for selecting one of said functions in accordance with a wheel associated with a newly received electric value, said function being selected as said predetermined value.

18. A slipping detection system according to claim 9, wherein said memory means includes a random access memory, and said comparator means and said slip judgement means include a microprocessor unit and a read-only memory.

19. A slipping detection system for a vehicle having a plurality of driven wheels comprising     a plurality of detecting means for detecting an electric value changing in relation to the rotational speed of a respective one of said driven wheels provided in said vehicle;

receiving means for sequentially receiving the outputs from said detecting means in a time division manner;

memory means for storing the received electric value for the respective wheels until a new value corresponding to said respective wheels is received;

comparing means for comparing the stored previously-received value for each wheel with said new value for each wheel; and     judging means for detecting a slipping of a wheel when the difference produced by said comparing means for that wheel exceeds a predetermined value.

* * * * *